(12) United States Patent
Du

(10) Patent No.: US 11,348,365 B2
(45) Date of Patent: May 31, 2022

(54) SKIN COLOR IDENTIFICATION METHOD, SKIN COLOR IDENTIFICATION APPARATUS AND STORAGE MEDIUM

(71) Applicant: GUANGZHOU BAIGUOYUAN INFORMATION TECHNOLOGY CO., LTD., Guangzhou (CN)

(72) Inventor: Lingxiao Du, Guangzhou (CN)

(73) Assignee: Bigo Technology Pte. Ltd., Mapletree Business (SG)

(*) Notice: Subject to any disclaimer, the term of this patent is extended or adjusted under 35 U.S.C. 154(b) by 0 days.

(21) Appl. No.: 16/646,765

(22) PCT Filed: Sep. 11, 2018

(86) PCT No.: PCT/CN2018/105103
§ 371 (c)(1),
(2) Date: Mar. 12, 2020

(87) PCT Pub. No.: WO2019/052449
PCT Pub. Date: Mar. 21, 2019

(65) Prior Publication Data
US 2020/0210682 A1 Jul. 2, 2020

(30) Foreign Application Priority Data

Sep. 14, 2017 (CN) .......................... 201710828760.5

(51) Int. Cl.
*G06T 7/90* (2017.01)
*G06V 40/16* (2022.01)
*G06V 10/56* (2022.01)

(52) U.S. Cl.
CPC .............. *G06V 40/162* (2022.01); *G06T 7/90* (2017.01); *G06V 10/56* (2022.01); *G06V 40/169* (2022.01); *G06T 2207/30201* (2013.01)

(58) Field of Classification Search
CPC .......... G06K 9/00234; G06K 9/00275; G06K 9/4652; G06T 7/90; G06T 2207/30201
See application file for complete search history.

(56) References Cited

U.S. PATENT DOCUMENTS 7,426,296 B2 * 9/2008 Lee .................... G06K 9/00234
382/118
8,244,003 B2 * 8/2012 Free .................... G06K 9/00234
382/118
(Continued)

FOREIGN PATENT DOCUMENTS

CN 101251890 A 8/2008
CN 103577791 A 2/2014
(Continued)

OTHER PUBLICATIONS

First office action of Chinese application No. 201710828760.5 dated Jun. 26, 2019.
(Continued)

*Primary Examiner* — Phuoc Tran
(74) *Attorney, Agent, or Firm* — Dilworth & Barrese, LLP

(57) ABSTRACT

A skin color identification method comprises: acquiring an image of human face; determining a target color gamut difference of respective pixels in the image of human face, the target color gamut difference of the respective pixels being a difference between intensity values of two designated color components of the respective pixels; and determining a confidence degree of skin color that the skin color of a human face in the image of human face belongs to a target skin color according to the target color gamut differences of all pixels in the image of human face, the confidence degree of skin color reflecting a probability that the skin color of the human face in the image of human face is
(Continued)

the target skin color. A skin color identification apparatus and a computer-readable storage medium are further provided.

18 Claims, 7 Drawing Sheets

(56) References Cited

U.S. PATENT DOCUMENTS

| | | | |
|---|---|---|---|
| 8,588,309 B2* | 11/2013 | Doepke | G06K 9/00234 375/240.24 |
| 10,430,694 B2* | 10/2019 | Yao | G06K 9/38 |
| 2009/0303336 A1* | 12/2009 | Utsugi | G06T 7/11 348/222.1 |
| 2010/0158363 A1 | 6/2010 | Jiang et al. | |
| 2010/0177981 A1* | 7/2010 | Wang | G06T 5/005 382/260 |
| 2015/0054980 A1* | 2/2015 | Nikkanen | H04N 9/643 348/223.1 |

FOREIGN PATENT DOCUMENTS

| | | |
|---|---|---|
| CN | 105279487 A | 1/2016 |
| CN | 106096588 A | 11/2016 |
| CN | 106097261 A | 11/2016 |
| CN | 106210521 A | 12/2016 |
| CN | 107025441 A | 8/2017 |
| CN | 107564073 A | 1/2018 |
| GB | 2396504 A | 6/2004 |

OTHER PUBLICATIONS

Second office action of Chinese application No. 201710828760.5 dated Mar. 5, 2020.

* cited by examiner

SKIN COLOR IDENTIFICATION METHOD, SKIN COLOR IDENTIFICATION APPARATUS AND STORAGE MEDIUM

CROSS-REFERENCE TO RELATED APPLICATION

This application is a National Stage of International Application No. PCT/CN2018/105103, filed on Sep. 11, 2018, which claims priority to Chinese Patent Applications No. 201710828760.5 filed with the China National Intellectual Property Administration on Sep. 14, 2017 and entitled "SKIN COLOR IDENTIFICATION METHOD, SKIN COLOR IDENTIFICATION DEVICE AND STORAGE MEDIUM", the entire contents of which are incorporated herein by reference.

TECHNICAL FIELD

The present disclosure relates to the field of image processing, and more particular, to a skin color identification method, a skin color identification apparatus and a storage medium.

BACKGROUND

With the popularity of a terminal such as a mobile phone, more and more people like to make a video call or live broadcast through the terminal. During the video call or the live broadcast, the terminal can perform skin beautification on a collected image human face, and the terminal adopts different skin beautifying solutions upon skin beautification, for an image of human face with target skin color and for an image of human face with non-target skin color. For example, the terminal can adopt a black-skin beautifying solution (a skin beautifying solution for a human body with a black skin) to beautify the image of human face with black skin color (the target skin color), and adopt a non-black-skin beautifying solution (a skin beautifying solution for a human body with a non-black skin) to beautify the image of human face with a non-black skin color (a non-target skin color). Thus, prior to performing skin beautification on the image of human face, it is necessary for the terminal determine whether the skin color of a human face in the image of human face is the target skin color or not.

In related arts, the terminal determines whether the skin color of the human face is the target skin color through the followings: the terminal collects an image of human face in an RGB color mode, acquires intensity values (also referred to as color values) of a red color component, a green color component and a blue color component of the image of human face, and compares the intensity value of the red color component with a red color intensity value range corresponding to the target skin color, the intensity value of the green color component with a green color intensity value range corresponding to the target skin color, the intensity value of the blue color component with a blue color intensity value range corresponding to the target skin color; and when the intensity value of the red color component falls into the red color intensity value range corresponding to the target skin color, the intensity value of the green color component falls into the green color intensity value range corresponding to the target skin color, and the intensity value of the blue color component falls into the blue color intensity value range corresponding to the target skin color, the terminal determines the skin color of the human face as the target skin color, otherwise, the terminal determines the skin color of the human face as the non-target skin color.

During implementation of the present disclosure, the inventors found that the prior art had at least the following problems.

Since the intensity value of respective color components in the image of human face in the RGB color mode is correlated with luminance of the respective colors, the image of human face in the RGB color mode is susceptible to illumination, resulting in that the intensity value, determined by the terminal, of the respective color components of the image of human face is relatively low in accuracy, and further leading to a relatively low accuracy in determining the target skin color by the terminal.

SUMMARY

The present disclosure provides a skin color identification method, a skin color identification device and a storage medium, which can solve the problem that a terminal determines a target skin color with low accuracy. The technical solutions are as follows.

According to the first aspect of the embodiments of the present disclosure, a skin color identification method is provided, comprising: acquiring an image of human face; determining a target color gamut difference of respective pixels in the image of human face, the target color gamut difference of the respective pixels being a difference between intensity values of two designated color components of the respective pixels; and determining a confidence degree of skin color that the skin color of a human face in the image of human face belongs to a target skin color according to the target color gamut differences of all pixels in the image of human face, the confidence degree of skin color reflecting a probability that e skin color of the human face in the image of human face is the target skin color.

According to the second aspect of the embodiments of the present disclosure provides a skin color identification apparatus, comprising: a processor; and a memory storing instructions executable by the processor, wherein the processor is configured to implement the following steps when executing the executable instructions: acquiring an image of human face; determining a target color gamut difference of respective pixels in the image of human face, the target color gamut difference of the respective pixels being a difference between intensity values of two designated color components of the respective pixels; and determining a confidence degree of skin color that the skin color of a human face in the image of human face belongs to a target skin color according to the target color gamut differences of all pixels in the image of human face, the confidence degree of skin color reflecting a probability that the skin color of the human face in the image of human face is the target skin color.

A third aspect of the embodiments of the present disclosure provides a computer-readable storage medium storing instructions which cause a processing component to execute the skin color identification method of the first aspect or any optional mode of the first aspect when the instructions are operated on the processing component.

The technical solutions of the present disclosure have the following beneficial effects.

With the skin color identification method and device and the storage medium provided by the embodiments of the present disclosure, after a terminal acquires an image of human face, a target color gamut difference of respective pixels in the image of human face is determined, and a confidence degree of skin color that the skin color of the human face in the image of human face belongs to a target skin color is determined according to the target color gamut differences of all pixels in the image of human face. Since the target color gamut difference can eliminate influence of illumination on the image of human face, and the influence of illumination on the image of human face can be avoided, the problem that the terminal determines the target skin color with low accuracy can be solved, and the accuracy with which terminal determines the target skin color can be improved.

It is to be understood that both the foregoing general description and the following detailed description are exemplary and explanatory only and are not intended to limit the present disclosure.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

Figure 1:
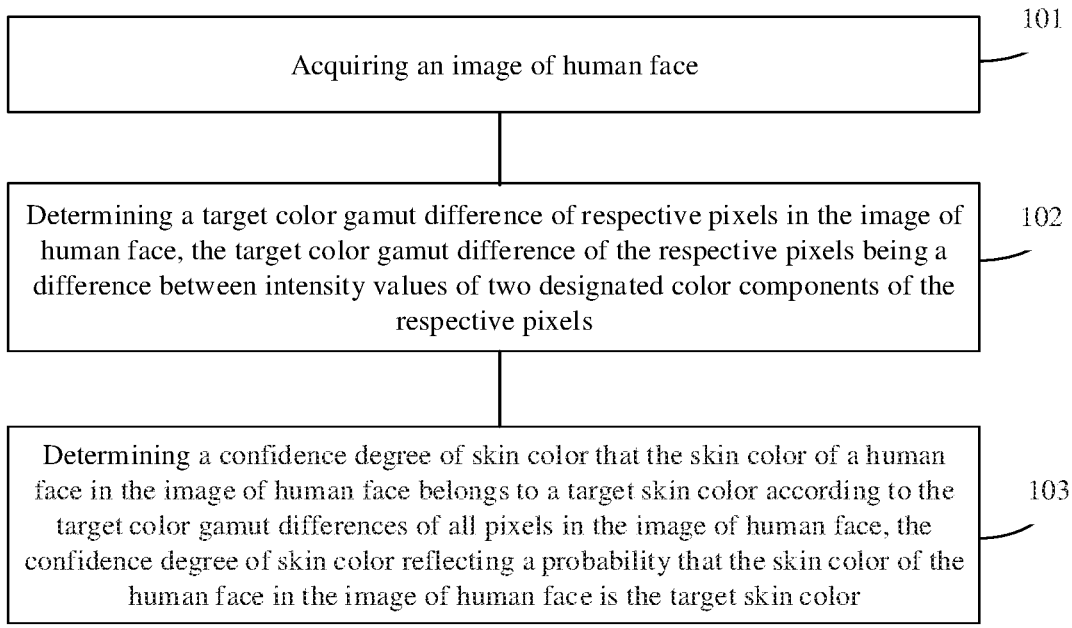
FIG. 1 is a flow chart of a skin color identification method in accordance with an embodiment of the present disclosure.

The accompanying drawings, which are incorporated in and constitute a part of this specification, illustrate embodiments consistent with the present disclosure and, together with the description, serve to explain the principles of the present disclosure.

DETAILED DESCRIPTION

In order to describe the objects, technical solutions and advantages in the embodiments of the present more clearly, the present disclosure will be described in detail below in combination with the accompanying drawings. Apparently, the described embodiments are merely some embodiments, rather than all embodiments, of the present disclosure. Based on the embodiments of the present disclosure, all other embodiments derived by a person of ordinary skill in the art without creative efforts shall fall within the protection scope of the present disclosure.

Before describing methods provided by the embodiments of the present disclosure in detail, a YUV color mode and an RGB color mode involved in the embodiments of the present disclosure will be introduced first.

The YUV color mode is a color coding mode used for the European television system, and is a color mode adopted by a Phase Alteration Line (PAL) and Sequentiel Couleur A Memoire (SECAM) analog color television system. In a modern color television system, a three-tube color camera or a color Charge-coupled Device (CCD) camera is usually used to capture an image. Then, a captured color image signal is subjected to color separation, amplification and correction to obtain an image in the RGB color mode. The image in the RGB color mode is processed by a matrix transformation circuit to obtain a luminance signal Y, a color difference signal B-Y and a color difference signal R-Y. After that, the luminance signal Y, the color difference signal B-Y and the color difference signal R-Y are encoded separately to obtain an encoded luminance signal Y, an encoded color difference signal B-Y, and an encoded color difference signal R-Y. Finally, the same channel is used to transmit the encoded luminance signal. Y, the encoded color difference signal B-Y and the encoded color difference signal R-Y. The color difference signal B-Y is a signal of a blue color chrominance component U. The color difference signal R-Y is a signal of a red color chrominance component V. In the image in the YUV color mode, the luminance signal Y and the signals of the chrominance components (e.g., the signal of the blue color chrominance component U and the signal of the red color chrominance component V) are separated from each other.

During a video call or a video broadcast, a skin beautifying solution is often required to process a collected image of human face so as to eliminate minor blemishes on a human face in the image of human face. For the images of human faces with different skin colors, different effects will be achieved by processing via the same skin beautifying solution. Particularly, a black skin and a yellow skin are of much difference. If the same skin beautifying solution is adopted to process the image of human face with black skin and the image of human face with yellow skin, it is difficult to achieve a skin beautifying effect. Therefore, different skin beautifying solutions are usually adopted to process the image of human faces with different skin colors. Thus, it is necessary to identify the skin color of the human face in the image of human face before the skin beautifying solution is performed for processing the image of human face.

The skin color identification method provided by the embodiment of the present disclosure can be performed to identify a target skin color, and can be executed by a terminal such as a smart phone, a tablet PC, a smart television, a smart watch, a laptop and a desk computer.

Refer to FIG. 1, which is a flow chart of a skin color identification method in accordance with an embodiment of the present disclosure. The skin color identification method can be executed by a terminal. Referring to FIG. 1, the skin color identification method comprises:

step 101: acquiring an image of human face;

step 102: determining a target color gamut difference of respective pixels in the image of human face, the target color gamut difference of the respective pixels being a difference between intensity values of two designated color components of the respective pixels; and step 103: determining a confidence degree of skin color that the skin color of a human face in the image of human face belongs to a target skin color according to the target color gamut differences of all pixels in the image of human face, the confidence degree of skin color reflecting a probability that the skin color of the human face in the image of human face is the target skin color.

In summary, with the skin color identification method provided by the embodiments of the present disclosure, after a terminal acquires an image of human face, a target color gamut difference of respective pixels in the image of human face is determined, and a confidence degree of skin color that the skin color of the human face in the image of human face belongs to a target skin color is determined according to the target color gamut differences of all pixels in the image of human face. Since the target color gamut difference can eliminate influence of illumination on the image of human face, and influence of illumination on the image of human face is avoided, the problem that the terminal determines the target skin color with low accuracy can be solved, and the accuracy with which the terminal determines the target skin color can be improved.

Figure 2:
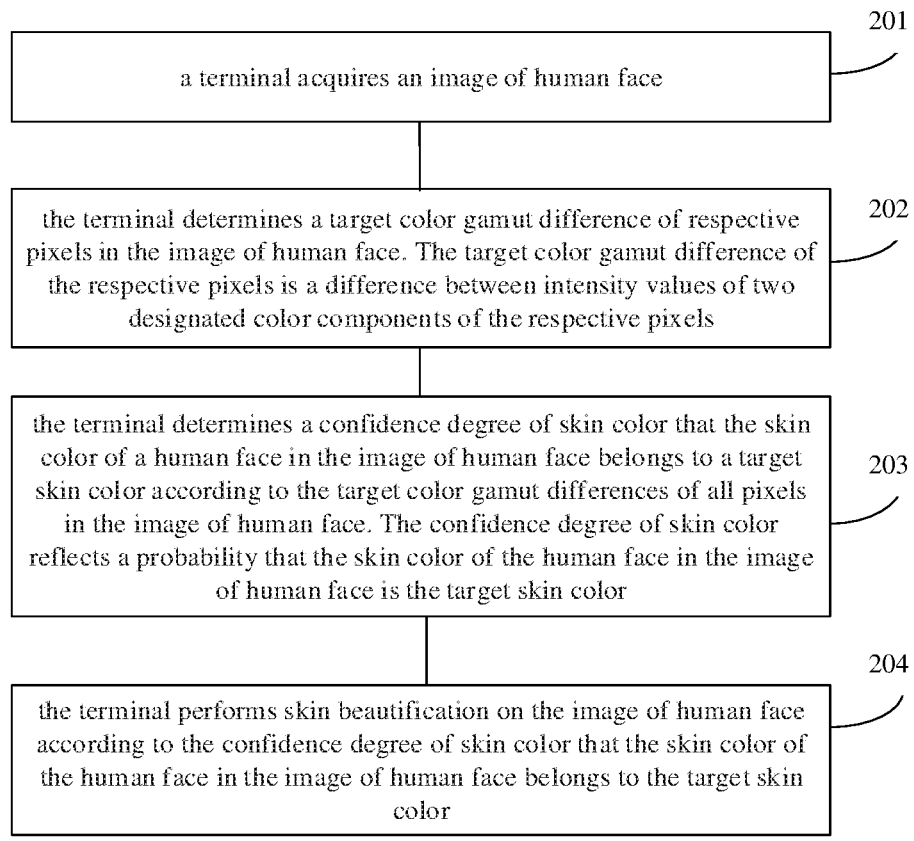
FIG. 2 is a flow chart of a skin color identification method in accordance with another embodiment of the present disclosure.

Refer to FIG. 2, which is a flow chart of a skin color identification method in accordance with another embodiment of the present disclosure. The skin color identification method can be executed by a terminal. Referring to FIG. 2, the skin color identification method comprises the following steps.

In step 201, a terminal acquires an image of human face.

In the present embodiment, the terminal can acquire the image of human face during a video broadcast or a video call, and the terminal can further determine the image of human face in a video or picture stored thereon, which will not be limited by the present embodiment. The image of human face refers to an image of a human face.

Optionally, the terminal is provided with a camera. The terminal acquires the image of human face by the camera. The image of human face may be an image of human face with a target skin color. The target skin color may be a skin color identified by the skin color identification method according to the present embodiment. For example, the target skin color is black skin color. It is to be understood that the present embodiment takes that a camera is a camera provided in a terminal as an example for explanation. In practice, the camera may further be an independent camera, which will not be limited by the present embodiment.

In step 202, the terminal determines a target color gamut difference of respective pixels in the image of human face. The target color gamut difference of the respective pixels is a difference between intensity values of two designated color components of the respective pixels.

Figure 3:
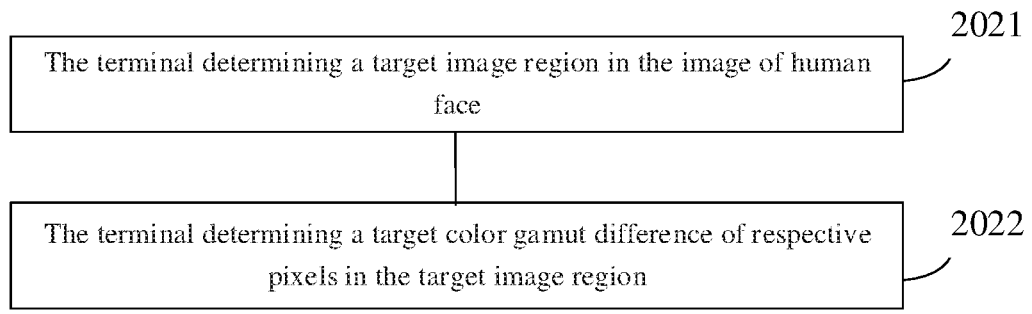
FIG. 3 is a flow chart of determining a target color gamut difference of respective pixels in an image of human face in accordance with an embodiment of the present disclosure.

In the present embodiment, the terminal may determine the target color gamut difference of respective pixels in the image of human face and may also select a target image region from the image of human face and determine the target color gamut difference of respective pixels in the target image region. The embodiments of the present disclosure present embodiment will be described by taking determining the target color gamut difference of respective pixels in the target image region as an example. Exemplarily, referring to FIG. 3, which is a flow chart of determining a target color gamut difference of respective pixels in an image of human face in accordance with an embodiment of the present disclosure, the method comprises the following sub-steps.

In sub-step 2021, the terminal determines a target image region in the image of human face.

In the embodiment of the present disclosure, the terminal can determine the target image region in the image of human face after acquiring the image of human face. The target image region may be a region comprising a human face, or a region comprising most part of a human face, in the image of human face. That is, the target image region comprises image of most of the human face.

Optionally, the target image region may be a region surrounded by a human face frame. Alternatively, the target image region may be a quarter region in the center of a region surrounded by a human face frame and is a region, and the target image region is an area located at the center of the image of human face and comprising at least 10*10 pixels. Optionally, when a quarter region at the center of the region surrounded by the human face frame comprises more than 10*10 pixels, the target image region may be the quarter region at the center of the region surrounded by the human face frame. When a quarter region at the center of the region surrounded by the human face frame comprises not more than 10*10 pixels, the target image region is a region comprising 10*10 pixels, at the center of the image of human face.

Figure 4:
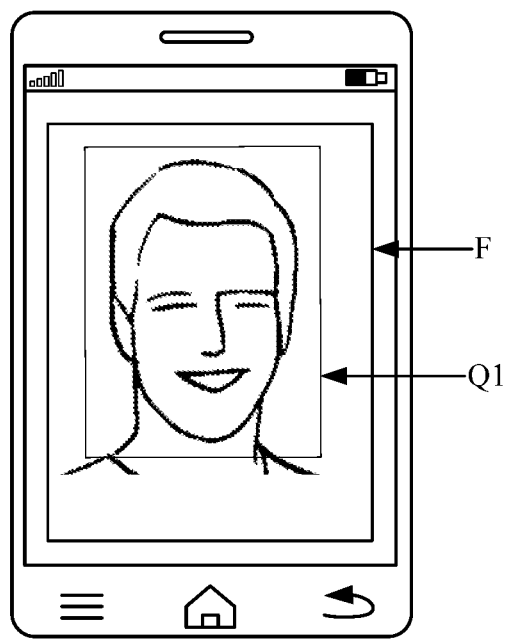
FIG. 4 is a schematic diagram of a target image region in accordance with an embodiment of the present disclosure.
Figure 5:
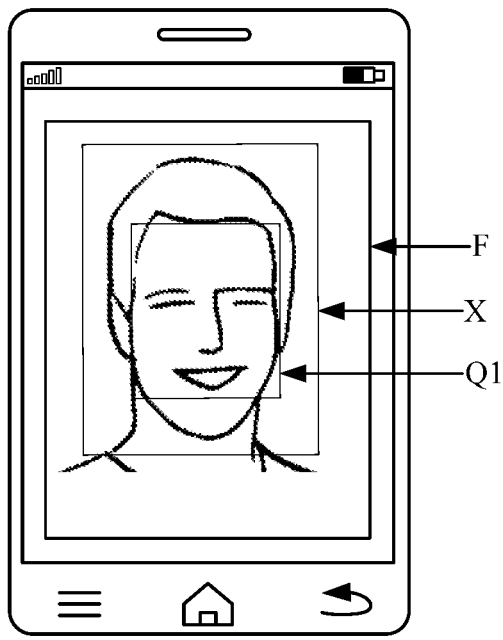
FIG. 5 is a schematic diagram of another target image region in accordance with an embodiment of the present disclosure.

Exemplarily, after acquiring an image of human face F, the terminal can determine a target image region Q1 in the image of human face F. Optionally, as illustrated in FIG. 4, the target image region Q1 is a region surrounded by a human face frame (not illustrated in FIG. 4) in the image of human face F. When the region surrounded by the human face frame comprises 40*60 pixels, the target image region Q1 comprises 40*60 pixels. Alternatively, as illustrated in FIG. 5, the target image region Q1 is a quarter region at the center of a region surrounded by a human face frame X in the image of human face F. When the region surrounded by the human face frame X comprises 40*60 pixels, a quarter region at the center of the region surrounded by the human face frame X comprises 20*30 pixels. Thus, the target image region Q1 comprises 20*30 pixels.

It is to be understood that the human face frame is a virtual rectangular frame displayed when a human face is detected by the terminal through a human face detection technology. The human face detection technology can be a Viola-Jones human face detection technology or a human face detection technology based on deep learning. The development of the human face detection technology makes it possible to quickly and reliably detect a human face from a complicated background. In the embodiment of the present disclosure, implementation of detecting a human face by the terminal through the human body detection technology can be referred to related arts, which will not be elaborated herein.

In sub-step 2022, the terminal determines a target color gamut difference of respective pixels in the target image region.

After determining the target image region in the image of human face, the terminal can determine the target color gamut differences of respective pixels in the target image region. The target color gamut differences of the respective pixels are a difference between intensity values of two designated color components in the respective pixels. In the present embodiment, the terminal can adopt different methods to determine the target color gamut differences of respective pixels in the target image region according to different color modes of the image of human face. In the RGB color mode, various colors are obtained by changes of a red-light channel, a green-light channel and a blue-light channel and superimposition of them. Thus, color components of the image of human face in the RGB color mode comprise a red color component, a green color component and a blue color component. Therefore, when the image of human face is an image of human face in the RGB color mode, the terminal can directly perform a subtraction on the intensity values of the two designated color components in respective pixels to obtain the target color gamut difference of the respective pixels; and when the image of human face is an image of human face in the YUV color mode, the terminal can calculate the target color gamut difference of respective pixels according to a chrominance value of a chrominance component of respective pixels. In the embodiment of the present disclosure, the terminal determining the target color gamut difference of the respective pixels in the target image region comprises the following two aspects.

In a first aspect, the terminal performs a subtraction on the intensity values of the two designated color components in respective pixels to obtain a target color gamut difference of the respective pixels.

After acquiring the image of human face, the terminal can determine the intensity values of at least two color components of respective pixels of the image of human face. The at least two color components may comprise the two designated color components. The terminal can perform a subtraction on the intensity values of the two designated color components to obtain a difference value therebetween. The difference value between the intensity values of the two designated color components is the target color gamut difference of the pixel. In the present embodiment, the target skin color may be a black skin color, and the two designated color components may comprise a red color component R and a green color component G. Implementation of determining the intensity values of the at least two color components of the respective pixels of the image of human face by the terminal can be referred to related arts, which will not be elaborated herein.

Optionally, after determining the target image region Q1 in the image of human face F, the terminal can determine the intensity values of the red color component R and the green color component G of respective pixels in the target image region Q1, and perform a subtraction on the intensity values of the red color component R and the green color component G of the respective pixels to obtain the target color gamut difference of the respective pixels. Exemplarily, it is assumed that the intensity value of the red color component R of a pixel 1 in the target image region Q1 is 200, and the intensity value of the green color component G of the pixel 1 is 60. Then, the terminal can obtain that the target color gamut difference of the pixel 1 is 140 by performing the subtraction on the intensity values of the red color component R and the green color component G of the pixel 1.

In a second aspect, the terminal calculates the target color gamut difference of respective pixels according to a chrominance value of a chrominance component of the respective pixels.

Figure 6:
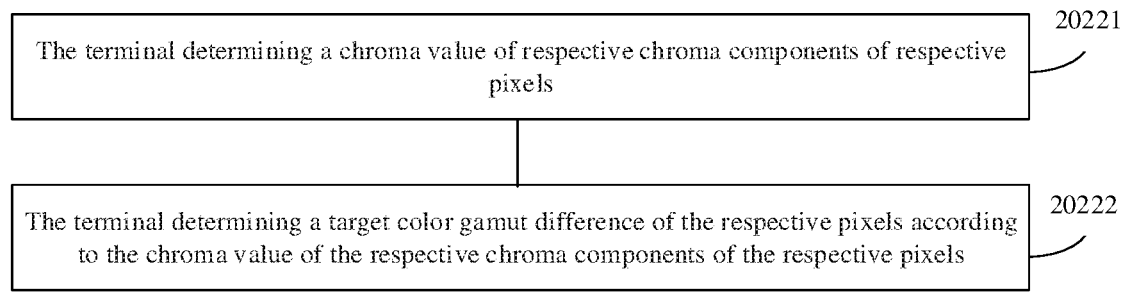
FIG. 6 is a flow charge of determining a target color gamut difference of respective pixels in a target image region in accordance with an embodiment of the present disclosure.

Refer to FIG. 6, which is a flow chart of determining a target color gamut difference of respective pixels in a target image region in accordance with an embodiment of the present disclosure. Referring to FIG. 6, the following sub-steps are comprised.

In sub-step 20221, the terminal determines a chrominance value of respective chrominance components of respective pixels.

The terminal can determine the chrominance value of the respective chrominance components of the respective pixels in the target image region. The chrominance components of the respective pixels can comprise: a blue color chrominance component U and a red color chrominance component V. Therefore, the terminal can determine the blue color chrominance component U and the red color chrominance component V of the respective pixels. Exemplarily, the terminal determines a chrominance value of the blue color chrominance component U and the red color chrominance component V of the respective pixels in the target image region Q. Implementation of determining the chrominance value of respective chrominance components of the respective pixels in the target image region by the terminal can be referred to related arts, which will not be elaborated herein.

In sub-step 20222, the terminal determines a target color gamut difference of the respective pixels according to the chrominance value of the respective chrominance components of the respective pixels.

Optionally, the terminal determines the target color gamut difference of the respective pixels according to the blue color chrominance component U and the red color chrominance component V of the respective pixels. In particular, the terminal calculates the target color gamut difference of the respective pixels through a formula for color gamut difference according to the chrominance value of the blue color chrominance component U and the chrominance value of the red color chrominance component V of the respective pixels.

The formula for color gamut difference is $C=a \times (U-128) + b \times (V-128)$, in which C represents the target color gamut difference of the respective pixels, U represents the blue color chrominance component of the respective pixels, V represents the red color chrominance component of the respective pixels, and both a and b are constants.

In the embodiment of the present disclosure, values of both a and b can be set according to actual situations. In practice, a and b may be BT.601 (Studio encoding parameters of digital television for standard 4:3 and wide screen 16:9 aspect ratios), comprising: when a=0.334, b=2.116; and when a=0.392, b=2.409. Alternatively, both a and b may be BT.709 (parameter values for the HDTV standards for production and international programme exchange), comprising: when a=0.1873, b=2.0429; and when a=0.2132, b=2.3256. Thus, the formula for color gamut difference may be any of the following formulas.

(1) When a=0.334, and b=2.116, the formula for color gamut difference is:

$$C=0.344 \times (U-128) + 2.116 \times (V-128);$$

(2) when a=0.392 and b=2.409, the formula for color gamut difference is:

$$C=0.392 \times (U-128) + 2.409 \times (V-128);$$

(3) when a=0.1873 and b=2.0429, the formula for color gamut difference is:

$$C=0.1873 \times (U-128)+2.0429 \times (V-128);\text{ and}$$

(4) when a=0.2132 and b=2.3256, the formula for color gamut difference is:

$$C=0.2132 \times (U-128)+2.3256 \times (V-128).$$

In practice, when the target color gamut differences of the respective pixels are calculated according to the chrominance value of the respective chrominance components of the respective pixels, it can be determined which of the above 4 formulas is used to calculate the target color gamut difference of the respective pixels according to a system of the terminal. For example, for a terminal of an Android system, the target color gamut difference of the respective pixels can be calculated by formula (1) or (3); and for a terminal of an iOS system, the target color gamut difference of the respective pixels may be calculated by any of the above four formulas.

Exemplarily, it is assumed that the chrominance value of the blue color chrominance component of the pixel 1 in the target image region Q1 is 150 and the chrominance value of the red color chrominance component is 191. Then, the target color gamut difference of the pixel 1, calculated by the terminal with formula (1), may be 140.15.

It should be noted: the present embodiment is described by taking that the terminal selects a target image region from the image of human face and determines the target color gamut difference of the respective pixels in the target image region as an example. In practice, the terminal may further determine the target color gamut difference of the respective pixels in the image of human face. Implementation of determining the target color gamut differences of the respective pixels in the image of human face is the same as or similar to the implementation of determining the target color gamut difference of the respective pixels in the target image region, and therefore, will not be elaborated herein. Since the pixels in the target image region are less than those in the image of human face, the calculating amount of determining the target color gamut difference of the respective pixels in the target image region is relatively smaller. In the embodiment of the present disclosure, the calculating amount can be reduced by determining the target color gamut difference of the respective pixels in the target image region.

In step 203, the terminal determines a confidence degree of skin color that the skin color of a human face in the image of human face belongs to a target skin color according to the target color gamut differences of all pixels in the image of human face. The confidence degree of skin color reflects a probability that the skin color of the human face in the image of human face is the target skin color.

After determining the target color gamut difference of the respective pixels in the image of human face, the terminal can determine the confidence degree of skin color that the skin color of the human face in the image of human face belongs to the target skin color according to the target color gamut differences of all pixels in the image of human face. The confidence degree of skin color reflects a probability that the skin color of the human face in the image of human face is the target skin color, namely, reflecting likelihood that the skin color of the human face in the image of human face is the target skin color.

Figure 7:
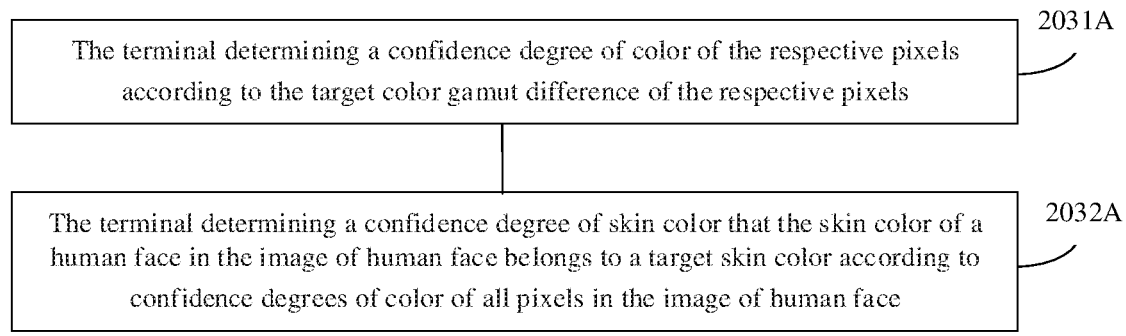
FIG. 7 is a flow chart of determining a confidence degree of skin color that the skin color of a human face in an image of human face belongs to a target skin color in accordance with an embodiment of the present disclosure.

Refer to FIG. 7, which is a flow chart of determining a confidence degree of skin color that the skin color of a human face in an image of human face belongs to a target skin color in accordance with an embodiment of the present disclosure. Referring to FIG. 7, the following steps are comprised.

In step 2031A, the terminal determines a confidence degree of color of the respective pixels according to the target color gamut difference of the respective pixels.

In the present embodiment, the terminal may determine the confidence degree of color of the respective pixels according to the target color gamut difference of the respective pixels. Optionally, the terminal calculates the confidence degree of color of the respective pixels with a formula for confidence degree of color according to the target color gamut difference of the respective pixels.

$$P = \begin{cases} 1.0, & C < C_{min} \\ \dfrac{C - C_{min}}{C_{max} - C_{min}}, & C_{min} \leq C \leq C_{max}, \\ 0.0, & C > C_{max} \end{cases}$$

The formula for confidence degree of color is in which P represents the confidence degree of color of the respective pixels, C represents the target color gamut difference of the respective pixels, $C_{min}$ represents a minimum value of the target color gamut difference, and $C_{max}$ represents a maximum value of the target color gamut difference.

The terminal can determine a relationship between the target color gamut differences and $C_{min}$ and $C_{max}$ of the respective pixels and substitute the target color gamut difference of the respective pixels into the formula for confidence degree of color to calculate the confidence degree of color of the respective pixels. Exemplarily, the terminal substitutes the target color gamut degree of the pixel 1 into the formula for confidence degree of color to calculate the confidence degree of color of the pixel 1. It is assumed that the target color gamut difference C is 140, the minimum value $C_{min}$ of the target color gamut difference is 80, and the maximum value $C_{max}$ of the target color gamut difference is 160. Then, the terminal can determine that the confidence degree of color of the pixel 1 is 0.75 according to the formula.

It should be noted that in the embodiment of the present disclosure, the minimum value $C_{min}$ and the maximum value $C_{max}$ of the target color gamut difference may be obtained by the following way. In particular, statistics of target color gamut differences of pixels in a plurality of images of human face with a target skin color are obtained. A scatter diagram is drawn according to the statistics. Each scatter in the scatter diagram represents one target color gamut difference. Distribution of the target color gamut differences of the pixels in the image of human face with the target skin color is determined according to the scatter diagram. An interval of the target color gamut differences, in which the scatters are densely distributed, on the scatter diagram is taken as a value range of the target color gamut difference. A minimum value of the value range of the target color gamut difference is the minimum value $C_{min}$ of the target color gamut difference, and a maximum value of the value range of the target color gamut difference is the maximum value $C_{max}$ of the target color gamut difference. The process of obtaining the minimum value $C_{min}$ and the maximum value $C_{max}$ of the target color gamut difference may be implemented manually or by the terminal. When the process of obtaining the minimum value $C_{min}$ and the maximum value $C_{max}$ of the target color gamut difference is implemented manually, the minimum value $C_{min}$ and the maximum value $C_{max}$ in the target color gamut difference, which are manually determined, may be stored in the terminal.

Optionally, the target skin color may be a black skin color. Statistics of the target color gamut differences of pixels in a plurality of images of human face with the black skin color can be obtained. A scatter diagram S is drawn according to the target color gamut differences of the pixels in the plurality of images of human face with the black skin color. Each scatter in the scatter diagram S represents one target color gamut difference. Distribution of the target color gamut differences of the pixels in the image of human face with the black skin color is determined according to the scatter diagram S. An interval in which the scatters are densely distributed on the scatter diagram S is taken as a value range of the target color gamut difference. A minimum value in the value range of the target color gamut difference is the minimum value $C_{min}$ of the target color gamut difference, and a maximum value in the value range of the target color gamut difference is the maximum value $C_{max}$ of the target color gamut difference. Exemplarily, it is assumed that the interval of the target color gamut difference, in which the scatters are densely distributed on the scatter diagram S, is [80, 160]. Then, the minimum value $C_{min}$ of the target color gamut difference is 80, and the maximum value $C_{max}$ of the target color gamut difference is 160.

It should be noted that when the image of human face is an image of human face in the YUV color mode, before statistics of the target color gamut differences of pixels in a plurality of images of human face with the target skin color are obtained, target color gamut differences of the pixels in the image of human face can be calculated through a formula for target color gamut difference. In the process of calculating the target color gamut differences of the pixels in the image of human face, the formula for color gamut difference adopted is the same as the formula adopted by the terminal in sub-step 20222 for determining the target color gamut difference of the respective pixels according to the chrominance values of respective chrominance components of the respective pixels.

Exemplarily, if the formula for color gamut difference for determining the target color gamut difference of the respective pixels in step 20222 is C=0.344×(U−128)+2.116×(V−128), the formula for color gamut difference which is adopted for determining the maximum value $C_{max}$ and the minimum value $C_{min}$ of the target color gamut difference in step 203 is also C=0.344×(U−128)+2.116×(V−128).

In step 2032A, the terminal determines a confidence degree of skin color that the skin color of a human face in the image of human face belongs to a target skin color according to confidence degrees of color of all pixels in the image of human face.

After determining the confidence degree of color of the respective pixels in the image of human face, the terminal can determine the confidence degree of skin color that the skin color of the human face in the image of human face belongs to the target skin color according to the confidence degrees of color of all pixels in the image of human face. Optionally, the terminal can average the confidence degrees of color of all pixels in the image of human face to obtain an average confidence degree of color of the confidence degrees of color of all pixels in the image of human face, and determine the average confidence degree of color as the skin confidence degree of color that the skin color of the human face in the image of human face belongs to the target skin color.

It is assumed that there are n pixels in the image of human face in total and the confidence degrees of color of the n pixels are P1, P2, P3, P4, P5, . . . , Pn, respectively. The terminal can average P1, P2, P3, P4, P5, . . . , Pn to obtain the confidence degree of color of color, and determine the average confidence degree of color as the confidence degree of skin color that the skin color of the human face in the image of human face belongs to the target skin color. The average confidence degree of color may be as follows:

$$\overline{P} = \frac{P_1 + P_2 + P_3 + P_4 + P_5 + \ldots\ldots + P_n}{n}.$$

Exemplarily, it is assumed that the target skin color is black and the terminal determines an average value of the confidence degrees of color of n pixels in the image of human face F to be 0.7. Then, the terminal determines that the confidence degree of skin color that the skin color of the human face in the image of human face F belongs to the black skin is 0.7.

It should be noted: the embodiment of the present disclosure has been described by taking the following as an example, the terminal averaging the confidence degrees of color of all pixels in the image of human face to obtain the average confidence degree of color of the confidence degree of colors of all pixels in the image of human face and determining the average confidence degree of color as the confidence degree of skin color that the skin color of the human face in the image of human face belongs to the target skin color. In practice, the terminal may perform a weighting operation on the confidence degrees of color of all pixels in the image of human face to obtain a weighted value of the confidence degrees of color of all pixels in the image of human face, and determine the weighted value as the confidence degree of skin color that the skin color of the human face in the image of human face belongs to the target skin color. Certainly, the terminal may further adopt other methods to determine the confidence degree of skin color that the skin color of the human face in the image of human face belongs to the target skin color, which will not be repeated by the present embodiment.

In step 204, the terminal performs skin beautification on the image of human face according to the confidence degree of skin color that the skin color of the human face in the image of human face belongs to the target skin color.

After determining the confidence degree of skin color that the skin color of the human face in the image of human face belongs to the target skin color, the terminal can perform skin beautification on the image of human face according to the confidence degree of skin color. Optionally, the terminal may store a skin beautifying solution for the target skin color and a skin beautifying solution for a non-target skin color. Each skin beautifying solution comprises a skin beautifying parameter. The terminal can process the skin beautifying parameters of the skin beautifying solutions for the target skin color and the non-target skin color, obtain a skin beautifying parameter of the image of human face according to a processing result, and perform skin beautification on the image of human face according to the skin beautifying parameter of the image of human face.

Optionally, it is assumed that the confidence degree of skin color that the skin color of the human face in the image of human face belongs to the target skin color is P, the skin beautifying parameter, stored in the terminal, of the skin beautifying solution for the target skin color is e, and the skin beautifying parameter, stored in the terminal, of the skin beautifying solution for the non-target skin color is f. Then, the terminal can determine S=e×P+f×(1−P) as the skin beautifying parameter for the image of human face, and perform skin beautification on the image of human face according to the skin beautifying parameter. It should be noted that in practice, the skin beautifying solution comprises various skin beautifying parameters. In the present embodiment, the skin beautifying parameter e represents all skin beautifying parameters in the skin beautifying solutions for the target skin color, and the skin beautifying parameter f represents all skin beautifying parameters in the skin beautifying solutions for the non-target skin color.

Figure 8:
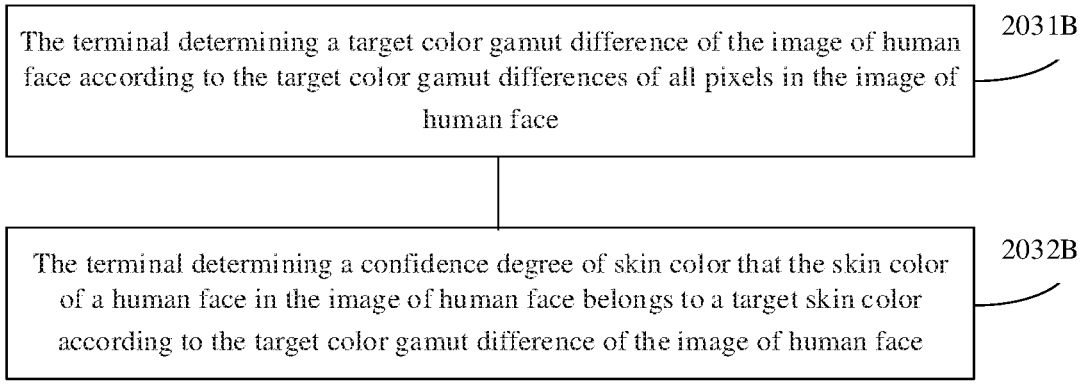
FIG. 8 is a flow chart of determining a confidence degree of skin color that the skin color of a human face in an image of human face belongs to a target skin color in accordance with another embodiment of the present disclosure.

It should be noted: the embodiment of the present disclosure is described by taking that the confidence degree of skin color that the skin color of the human face in the image of human face belongs to the target skin color is determined according to the confidence degrees of color of all pixels in the image of human face. In practice, the terminal may further determine the confidence degree of skin color that the skin color of the human face in the image of human face belongs to the target skin color according to the target color gamut difference of the image of human face. In particular, refer to FIG. 8, which is a flow chart of determining a confidence degree of skin color that the skin color of a human face in an image of human face belongs to a target skin color in accordance with one embodiment of the present disclosure. Referring to FIG. 8, the following steps are comprised.

In sub-step 2031B, the terminal determines a target color gamut difference of the image of human face according to the target color gamut differences of all pixels in the image of human face.

In the present embodiment, the terminal can determine the target color gamut difference of the image of human face according to the target color gamut differences of all pixels in the image of human face. Optionally, the terminal can average the target color gamut differences of all pixels in the image of human face to obtain an average target color gamut difference of the target color gamut differences of all pixels in the image of human face, and determine the average target color gamut difference as the target color gamut difference of the image of human face.

It is assumed that there are n pixels in the image of human face in total and the target color gamut differences of the n pixels are C1, C2, C3, C4, C5, . . . , and Cn, respectively. Then, the terminal can average C1, C2, C3, C4, C5, and Cn to obtain the average target color gamut difference, and determine the average target color gamut difference as the target color gamut difference of the image of human face. The average target color gamut difference can be as follows:

$$\overline{C} = \frac{C_1 + C_2 + C_3 + C_4 + C_5 + \ldots + C_n}{n}.$$

Exemplarily, the terminal determines that an average value of the target color gamut differences of n pixels in the image of human face F is 140, the terminal determines that the target color gamut difference of the image of human face F is 140.

It should be noted that, the present embodiment is described by taking that the terminal averages the target color gamut differences of all pixels in the image of human face to obtain the average target color gamut difference of the target color gamut differences of all the pixels in the image of human face and determines the average target color gamut difference as the target color gamut difference of the image of human face as an example. In practice, the terminal may perform a weighting operation on the target color gamut differences of all pixels in the image of human face to obtain a weighted value of the target color gamut differences of all pixels in the image of human face, and determine the weighted value as the target color gamut difference of the image of human face. Certainly, the terminal can further adopt other methods to determine the target color gamut difference of the image of human face, which will not be elaborated here.

In sub-step 2032B, the terminal determines a confidence degree of skin color that the skin color of a human face in the image of human face belongs to a target skin color according to the target color gamut difference of the image of human face.

Optionally, the terminal can calculate the confidence degree of skin color that the skin color of the human face in the image of human face belongs to the target human face through a formula for confidence degree of skin color according to the target color gamut difference of the image of human face.

Figure 9:
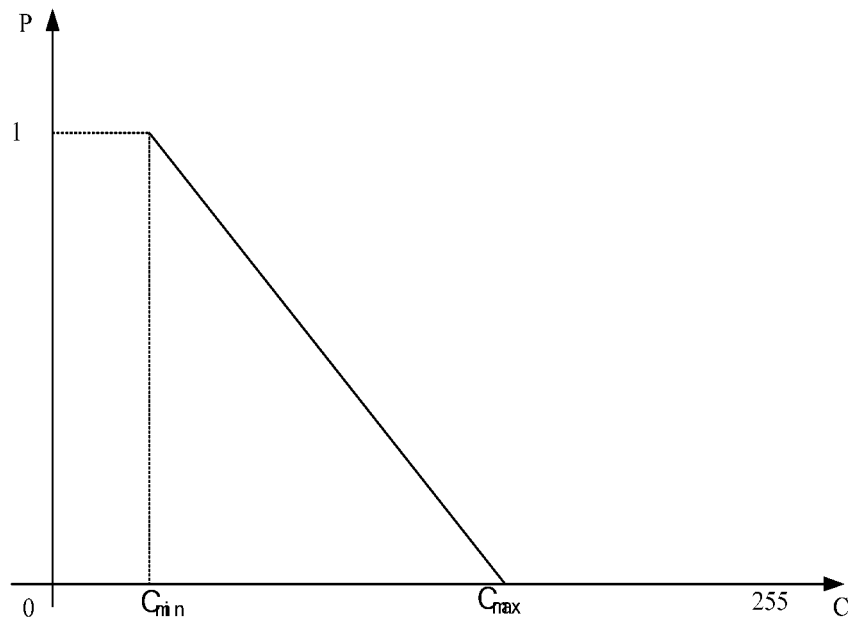
FIG. 9 is a diagram illustrating a relationship between a confidence degree of skin color and a target color gamut difference of an image of human face in accordance with an embodiment of the present disclosure.

The formula for confidence degree of skin color may be $$P = \begin{cases} 1.0, & C < C_{min} \\ \dfrac{C - C_{min}}{C_{max} - C_{min}}, & C_{min} \le C \le C_{max}, \\ 0.0, & C > C_{max} \end{cases}$$

in which P represents the confidence degree of skin color, C represents the target color gamut difference of the image of human face, $C_{min}$ represents a minimum value of the target color gamut difference, and $C_{max}$ represents a maximum value of the target color gamut difference. Refer to sub-step 2031A for determining $C_{min}$ and $C_{max}$, which will not be elaborated herein. It should be noted that in the present embodiment, within a certain range, the target color gamut difference C of the image of human face and the confidence degree of skin color P may be in linear relation. For example, as illustrated in FIG. 9, between $C_{min}$ and $C_{max}$, the target color gamut difference C of the image of human face and the confidence degree of skin color P can be in linear relation.

In summary, in the skin color identification methods provided by the embodiments of the present disclosure, after acquiring an image of human face, a terminal can determine a target color gamut difference of the respective pixels in the image of human face, and determine a confidence degree of skin color that the skin color of the human face in the image of human face belongs to a target skin color is determined according to the target color gamut differences of all pixels in the image of human face. Since the target color gamut difference can eliminate the influence of illumination on the image of human face and influence of the illumination on the image of human face can be avoided, thus the problem that the terminal determines the target skin color with low accuracy can be solved, and the accuracy with which the terminal determine the target skin color can be improved.

The followings are device embodiments of the present disclosure, which can be configured to execute the method embodiments of the present disclosure. Refer to the method embodiments of the present disclosure for undisclosed details of the device embodiments of the present disclosure.

Figure 10:
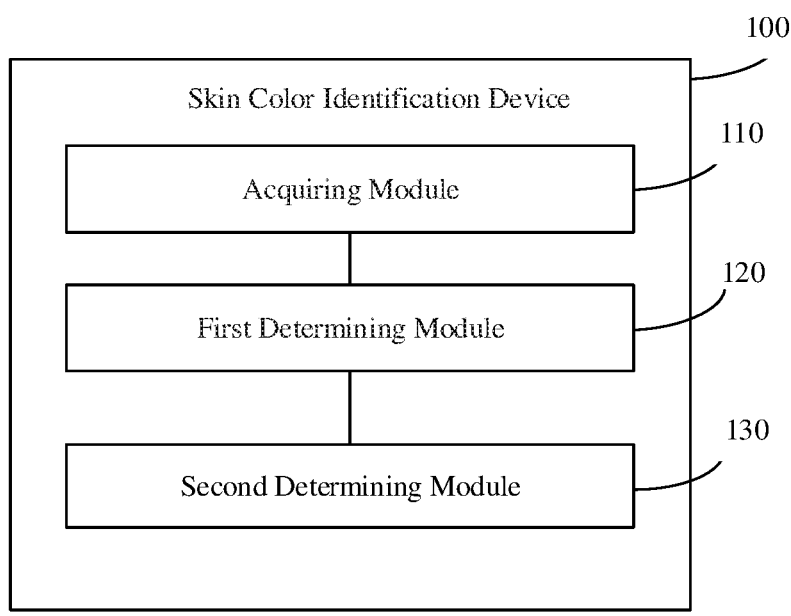
FIG. 10 is a block diagram of a skin color identification device in accordance with an embodiment of the present disclosure.

FIG. 10 is a block diagram of a skin color identification device 100 in accordance with one exemplary embodiment. The skin color identification device 100 can be implemented as a part or all of a terminal through software, hardware or a combination thereof. The terminal can be a smart phone, a tablet PC, a smart television, a smart watch, a laptop, a desk computer, etc. Referring to FIG. 10, the skin color identification device 100 can comprise:

an acquiring module 110 configured to acquire an image of human face;

a first determining module 120 configured to determine a target color gamut difference of respective pixels in the image of human face, the target color gamut difference of the respective pixels being a difference between intensity values of two designated color components of the respective pixels; and a second determining module 130 configured to determine a confidence degree of skin color that the skin color of a human face in the image of human face belongs to a target skin color according to the target color gamut differences of all pixels in the image of human face, the confidence degree of skin color reflecting a probability that the skin color of the human face in the image of human face is the target skin color.

In summary, in the skin color identification devices provided by the embodiments of the present disclosure, after acquiring an image of human face, the terminal determines a target color gamut difference of respective pixels in the image of human face, and determines a confidence degree of skin color that the skin color of the human face in the image of human face belongs to a target skin color according to the target color gamut differences of all pixels in the image of human face. Since the target color gamut difference can eliminate influence of illumination on the image of human face and the influence of the illumination on the image of human face can be avoided, the problem that the terminal determines the target skin color with low accuracy can be solved, and the accuracy with which the terminal determines the target skin color can be improved.

Figure 11:
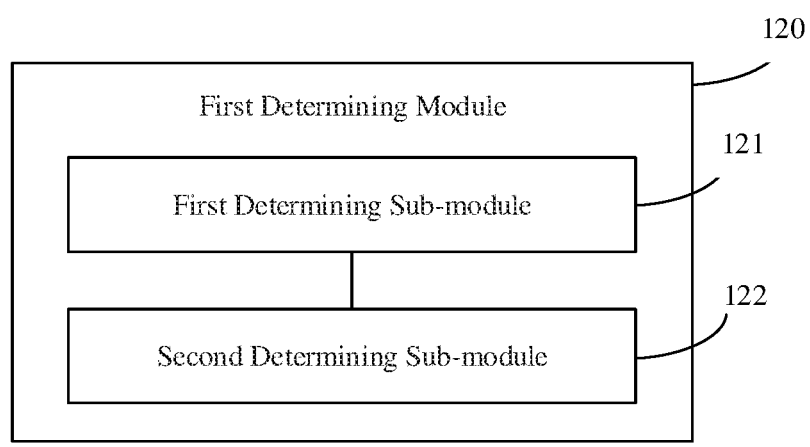
FIG. 11 is a block diagram of a first determining module in accordance with an embodiment of the present disclosure.

Optionally, refer to FIG. 11, which is a block diagram of a first determining module 120 in accordance with an embodiment of the present disclosure. Referring to FIG. 11, the first determining module 120 comprises:

a first determining sub-module 121, configured to determine a chrominance value of respective chrominance components of respective pixels; and a second determining sub-module 122, configured to determine a target color gamut difference of the respective pixels according to the chrominance value of respective chrominance components of the respective pixels.

Optionally, the second determining sub-module 122 is configured to calculate a target color gamut difference of the respective pixels through a formula for color gamut difference according to a chrominance value of the blue color chrominance components and a chrominance value of the red color chrominance components of the respective pixels.

The formula for color gamut difference is $C = a \times (U-128) + b \times (V-128)$ in which C represents the target color gamut difference of the respective pixels, U represents the blue color chrominance component of the respective pixels, V represents the red color chrominance component of the respective pixels, and both a and b are constants.

Figure 12:
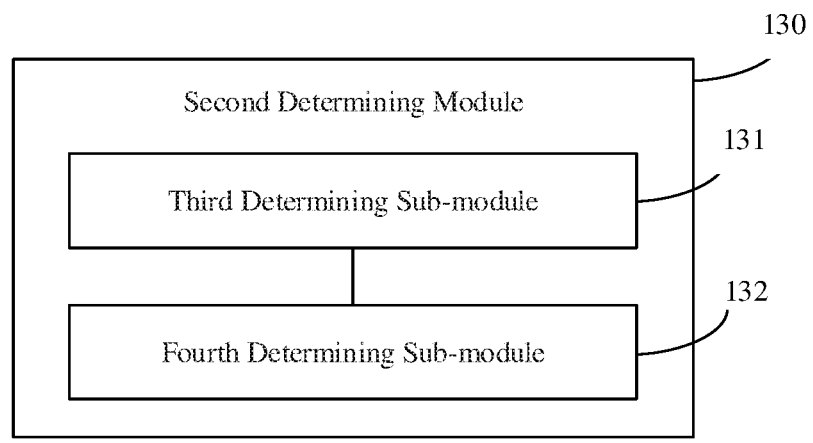
FIG. 12 is a block diagram of a second determining module in accordance with an embodiment of the present disclosure.

Optionally, refer to FIG. 12, which is a block diagram of a second determining module 130 in accordance with an embodiment of the present disclosure. Referring to FIG. 12, the second determining module 130 comprises:

a third determining sub-module 131, configured to determine a confidence degree of color of respective pixels according to the target color gamut difference of the respective pixels; and a fourth determining sub-module 132, configured to determine a confidence degree of skin color that the skin color of a human face in the image of human face belongs to a target skin color according to the confidence degrees of color of all pixels in the image of human face.

Optionally, the fourth determining sub-module 132 is configured to calculate a confidence degree of color of the respective pixels through a formula for confidence degree of color according to the target color gamut difference of the respective pixels.

The formula for confidence degree of color is $$P = \begin{cases} 1.0, & C < C_{min} \\ \dfrac{C - C_{min}}{C_{max} - C_{min}}, & C_{min} \leq C \leq C_{max} \\ 0.0, & C > C_{max} \end{cases},$$

in which P represents the confidence degree of color of the respective pixels, C represents the target color gamut difference of the respective pixels, $C_{min}$ represents a minimum value of the target color gamut difference, and $C_{max}$ represents a maximum value of the target color gamut difference.

Figure 13:
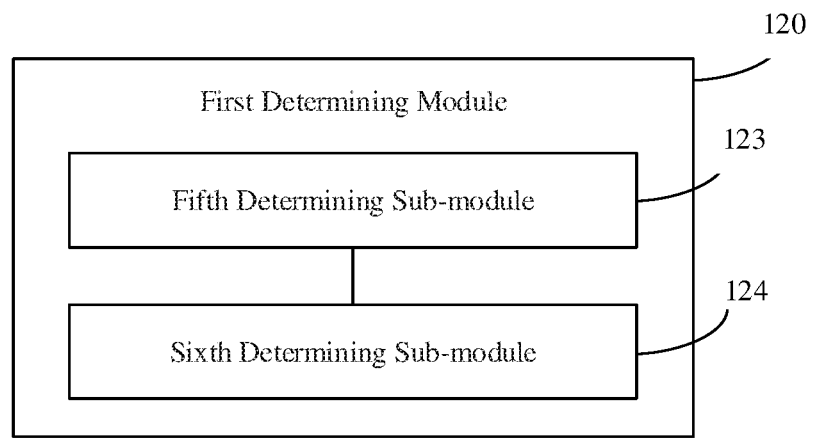
FIG. 13 is a block diagram of another first determining module in accordance with an embodiment of the present disclosure.

Optionally, refer to FIG. 13, which is a block diagram of a first determining module 120 in accordance with another embodiment of the present disclosure. Referring to FIG. 13, the first determining module 120 comprises:

a fifth determining sub-module 123, configured to determine a target image region in the image of human face; and a sixth determining sub-module 124, configured to determine, a target color gamut difference of respective pixels in the target image region.

Optionally, the two designated color components comprise a red color component and a green color component. The target skin color is a black skin color.

In summary, in the skin color identification devices provided by the embodiments of the present disclosure, after acquiring an image of human face, the terminal determines a target color gamut difference of the respective pixels in the image of human face, and determines a confidence degree of skin color that the skin color of the human face in the image of human face belongs to a target skin color according to the target color gamut differences of all pixels in the image of human face. Since the target color gamut difference can eliminate influence of illumination on the image of human face, and influence of the illumination on the image of human face can be avoided, thus, the problem that the terminal determines the target skin color with low accuracy can be solved, and the accuracy with which the terminal determines the target skin color can be improved.

The operation manners of the respective modules of the devices in the above embodiments have been described in the related method embodiments in detail, and will not be elaborated herein.

Figure 14:
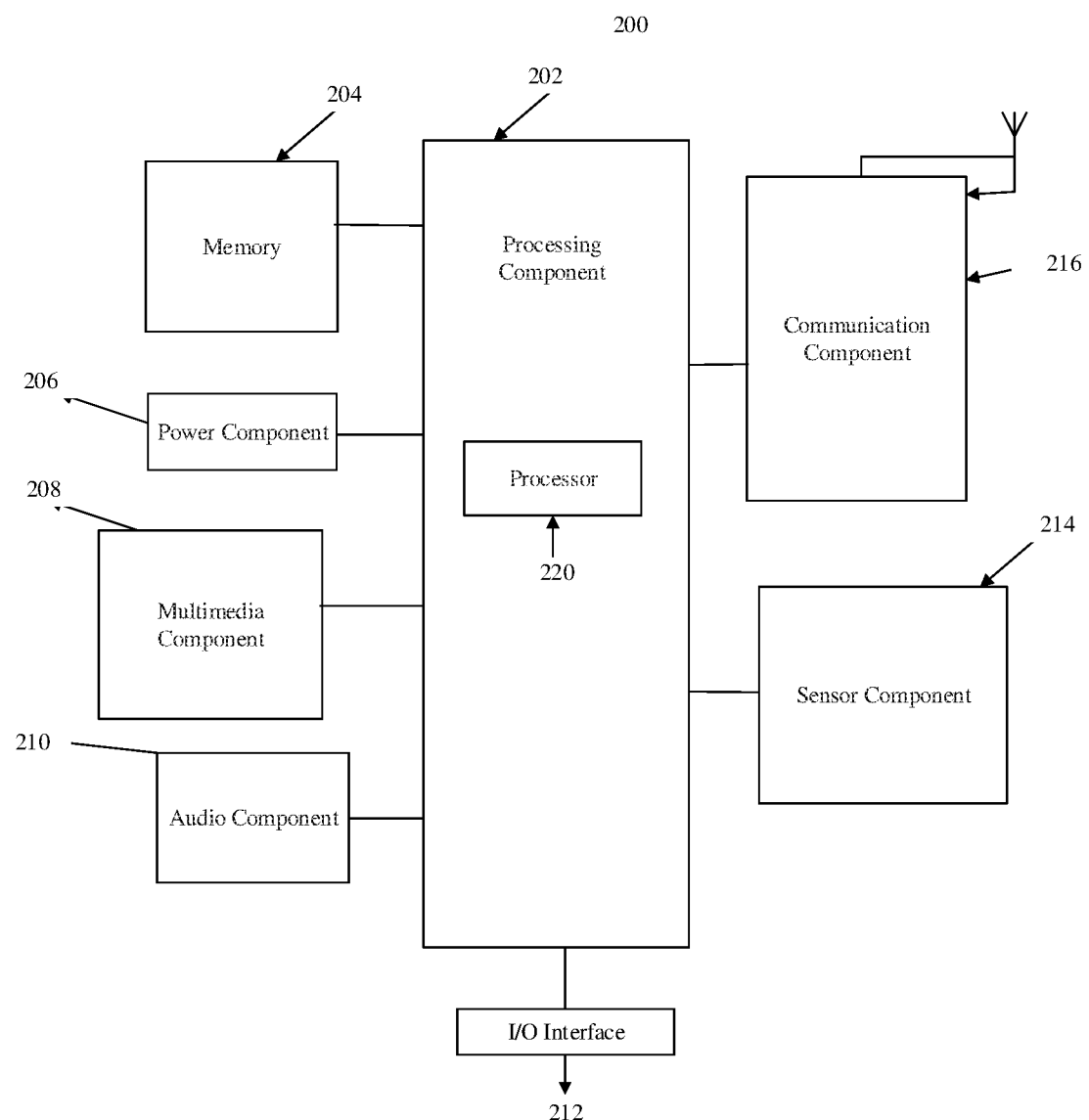
FIG. 14 is a block diagram of a skin color identification apparatus in accordance with an embodiment of the present disclosure.

FIG. 14 is a block diagram illustrating a skin color identification apparatus 200 according to an exemplary embodiment. For example, the apparatus 200 can be a mobile phone, a computer, a digital broadcast terminal, a message transceiver device, a game console, a tablet device, a medical equipment, a fitness equipment, a personal digital assistant, and the like.

Referring to FIG. 14, the device 200 can comprise one or more of the following components: a processing component 202, a memory 204, a power component 206, a multimedia component 208, an audio component 210, an input/output (I/O) interface 212, a sensor component 214, and a communication component 216.

The processing component 202 typically controls overall operations of the apparatus 200, such as the operations associated with display, telephone calls, data communications, positioning, camera operations, and recording operations. The processing component 202 may comprise one or more processors 220 to execute instructions to perform all or part of the steps in the above described methods. Moreover, the processing component 202 may comprise one or more modules which facilitate interaction between the processing component 202 and other components. For instance, the processing component 202 may comprise a multimedia module to facilitate the interaction between the multimedia component 208 and the processing component 202.

The memory 204 is configured to store various types of data to support the operation of the apparatus 200. Examples of such data comprise instructions for any applications or methods operated on the device 200, contact data, phonebook data, messages, pictures, video, etc. The memory 204 may be implemented using any type of volatile or non-volatile memory devices, or a combination thereof, such as a static random access memory (SRAM), an electrically erasable programmable read-only memory (EEPROM), an erasable programmable read-only memory (EPROM), programmable read-only memory (PROM), a read-only memory (ROM), a magnetic memory, a flash memory, a magnetic or optical disk.

The power component 206 supplies power to various components of the apparatus 200. The power component 206 may comprise a power management system, one or more power sources, and any other components associated with the generation, management, and distribution of power in the apparatus 200.

The multimedia component 208 comprises a screen providing an output interface between the apparatus 200 and the user. In some embodiments, the screen may comprise a liquid crystal display (LCD) and a touch panel (TP). If the screen comprises the touch panel, the screen may be implemented as a touch screen to receive input signals from the user. The touch panel comprises one or more touch sensors to sense touches, swipes, and gestures on the touch panel. The touch sensors can not only sense a touch or a boundary of swipe action, but also sense a period of time and a pressure associated with the touch or swipe action. In some embodiments, the multimedia component 208 comprises a front camera and/or a rear camera. The front camera and/or the rear camera may receive an external multimedia datum while the device 200 is in an operation mode, such as a photographing mode or a video mode. Each of the front camera and the rear camera may be a fixed optical lens system or have focus and optical zoom capability.

The audio component 210 is configured to output and/or input audio signals. For example, the audio component 210 comprises a microphone ("MIC") configured to receive an external audio signal when the device 200 is in an operation mode, such as a call mode, a recording mode, and a voice recognition mode. The received audio signal may be further stored in the memory 204 or transmitted via the communication component 216. In some embodiments, the audio component 210 further comprises a speaker for outputing audio signals.

The I/O interface 212 provides an interface between the processing component 602 and peripheral interface modules, such as a keyboard, a click wheel, a buttons, and the like. The buttons may comprise, but are not limited to, a home button, a volume button, a starting button, and a locking button.

The sensor component 214 comprises one or more sensors to provide status assessments of various aspects of the apparatus 200. For instance, the sensor component 214 may detect an ON/OFF status of the apparatus 200, relative positioning of components, e.g., the display and the keypad, of the apparatus 200, a change in position of the apparatus 200 or a component of the apparatus 200, a presence or absence of user contact with the apparatus 200, an orientation or an acceleration/deceleration of the apparatus 200, and a change in temperature of the apparatus 200. The sensor component 214 may comprise a proximity sensor configured to detect the presence of nearby objects without any physical contact. The sensor component 214 may further comprise a light sensor, such as a complementary metal oxide semiconductor (CMOS) or charge-coupled device (CCD) image sensor, for use in imaging applications. In some embodiments, the sensor component 214 may further comprise an accelerometer sensor, a gyroscope sensor, a magnetic sensor, a pressure sensor, or a temperature sensor.

The communication component 216 is configured to facilitate communication, wired or wirelessly, between the apparatus 200 and other apparatus. The apparatus 200 can access a wireless network based on a communication standard, such as WiFi, 2G, or 3G, or a combination thereof. In one exemplary embodiment, the communication component 216 receives a broadcast signal or broadcast associated information from an external broadcast management system via a broadcast channel. In one exemplary embodiment, the communication component 216 further comprises a near field communication (NFC) module to facilitate short-range communications. For example, the NFC module may be implemented based on a radio frequency identification (RFID) technology, an infrared data association (IrDA) technology, an ultra-wideband (MB) technology, a Bluetooth (BT) technology, and other technologies.

In exemplary embodiments, the apparatus 200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described skin color identification methods.

In exemplary embodiments, there is further provided a non-transitory computer-readable storage medium comprising instructions, such as the memory 204 comprising instructions. These instructions can be loaded and executed by the processor 220 in the apparatus 200 for performing the above skin color identification methods. For example, the non-transitory computer-readable storage medium can be a random-access memory (RAM), a read-only memory (ROM), a compact disk read-only memory (CD-ROM), a magnetic tape, a floppy disc, an optical data storage device, or the like.

A non-transitory computer-readable storage medium is provided. When instructions on the storage medium are executed by the processor in the apparatus 200, the apparatus 200 can execute a skin color identification method, the method comprising:

acquiring an image of human face;

determining a target color gamut difference of respective pixels in the image of human face, the target color gamut difference of the respective pixels being a difference between intensity values of two designated color components of the respective pixels; and determining a confidence degree of skin color that the skin color of a human face in the image of human face belongs to a target skin color according to the target color gamut differences of all pixels in the image of human face, the confidence degree of skin color reflecting a probability that the skin color of the human face in the image of human face is the target skin color.

In summary, in the skin color identification apparatus provided by the embodiments of the present disclosure, after the terminal acquiring an image of human face, a target color gamut difference of respective pixels in the image of human face is determined, and a confidence degree of skin color that the skin color of the human face in the image of human face belongs to a target skin color is determined according to the target color gamut differences of all pixels in the image of human face. Since the target color gamut difference can eliminate influence of illumination on the image of human face, the influence of illumination on the image of human face can be avoided, the problem that the terminal determines the target skin color with low accuracy can be solved, and the accuracy with which the terminal determines the target skin color can be improved.

An embodiment of the present disclosure further provides a skin color identification apparatus, comprising:

a processor; and a memory storing instructions executable by the processor, wherein the processor is configured to:

acquire an image of human face;

determine a target color gamut difference of respective pixels in the image of human face, the target color gamut difference of the respective pixels being a difference between intensity values of two designated color components of the respective pixels; and determining a confidence degree of skin color that the skin color of a human face in the image of human face belongs to a target skin color according to the target color gamut differences of all pixels in the image of human face, the confidence degree of skin color reflecting a probability that the skin color of the human face in the image of human face is the target skin color.

An embodiment of the present disclosure further provides a computer-readable storage medium storing instructions which cause a processing component to execute the skin color identification method illustrated in FIG. 1 or 2 when the instructions are operated on the processing component.

Other embodiments of the present disclosure can be available to those skilled in the art upon consideration of the specification and practice of the invention disclosed herein. The present application is intended to cover any variations, uses, or adaptations of the present disclosure following general principles of the present disclosure and comprise the common general knowledge or conventional technical means in the art without departing from the present disclosure. The specification and examples can be illustrated as illustrative only, and the true scope and spirit of the disclosure are indicated by the following claims.

The foregoing descriptions are merely preferred embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A skin color identification method, comprising:

acquiring an image of human face;

determining a target color gamut difference of respective pixels in the image of human face, the target color gamut difference of the respective pixels being a difference between intensity values of two designated color components of the respective pixels; and determining a confidence degree of color of the respective pixels in the image of human face according to the target color gamut difference of the respective pixels in the image of human face, and determining a confidence degree of skin color that the skin color of a human face in the image of human face belongs to a target skin color according to the confidence degree of color of all the pixels in the image of human face, the confidence degree of skin color reflecting a probability that the skin color of the human face in the image of human face is the target skin color, wherein determining the confidence degree of color of the respective pixels in the image of human face according to the target color gamut difference of the respective pixels in the image of human face comprises:

determining a maximum value and a minimum value among the target color gamut difference of the respective pixels, and determining a relationship between the target color gamut difference of the respective pixels and the maximum value and the minimum value; and calculating the confidence degree of color of the respective pixels according to the relationship between the target color gamut difference of the respective pixels and the maximum value and the minimum value.

2. The method of claim 1, wherein determining the target color gamut difference of the respective pixels in the image of human face comprises:

determining a chrominance value of respective chrominance components of the respective pixels; and determining a target color gamut difference of the respective pixels according to the chrominance value of the respective chrominance components of the respective pixels.

3. The method of claim 2, wherein the chrominance components of the respective pixels comprises a blue color chrominance component and a red color chrominance component, and determining the target color gamut difference of the respective pixels according to the chrominance value of the respective chrominance components of the respective pixels comprises:

calculating the target color gamut difference of the respective pixels through a formula for color gamut difference according to the chrominance value of the blue color chrominance component and a chrominance value of the red color chrominance component of the respective pixels, wherein the formula for color gamut difference is $C=a\times(U-128)+b\times(V-128)$, in which C represents the target color gamut difference of the respective pixels, U represents the blue color chrominance component of the respective pixels, V represents the red color chrominance component of the respective pixels, and both a and b are constants.

4. The method of claim 1, wherein calculating the confidence degree of color of the respective pixels according to the relationship between the target color gamut difference of the respective pixels and the maximum value and the minimum value comprises:

calculating a confidence degree of color of the respective pixels through a formula for confidence degree of color according to the relationship between the target color gamut difference of the respective pixels and the maximum value and the minimum value, wherein
the formula for confidence degree of color is $$P = \begin{cases} 1.0, & C < C_{min} \\ \dfrac{C - C_{min}}{C_{max} - C_{min}}, & C_{min} \le C \le C_{max} \\ 0.0, & C > C_{max} \end{cases},$$

in which P represents the confidence degree of color of the respective pixels, C represents the target color gamut difference of the respective pixels, $C_{min}$ represents a minimum value of the target color gamut difference, and $C_{max}$ represents a maximum value of the target color gamut difference.

5. The method of claim 1, wherein determining the maximum and the minimum among the target color gamut difference of the respective pixels comprises:
obtaining statistics of target color gamut differences of pixels in a plurality of images of human face with a target skin color, and drawing a scatter diagram according to the statistics, wherein each scatter in the scatter diagram represents one target color gamut difference;
determining distribution of the target color gamut differences of the pixels in the image of human face with the target skin color according to the scatter diagram; and
taking an interval of the target color gamut differences, in which the scatters are densely distributed, on the scatter diagram, as a value range of the target color gamut difference, wherein a minimum value of the value range of the target color gamut difference is the minimum value $C_{min}$ of the target color gamut difference, and a maximum value of the value range of the target color gamut difference is the maximum value $C_{max}$ of the target color gamut difference.

6. The method of claim 1, wherein determining a confidence degree of skin color that the skin color of a human face in the image of human face belongs to a target skin color according to the confidence degree of color of all the pixels in the image of human face comprises:
averaging the confidence degree of color of all the pixels in the image of human face to obtain an average confidence degree of color of the confidence degree of color of all the pixels in the image of human face, and determining the average confidence degree of color as the confidence degree of skin color that the skin color of a human face in the image of human face belongs to a target skin color.

7. The method of claim 1, wherein determining a confidence degree of skin color that the skin color of a human face in the image of human face belongs to a target skin color according to the confidence degree of color of all the pixels in the image of human face comprises:
performing a weighting operation on the confidence degrees of color of all pixels in the image of human face to obtain a weighted value of the confidence degrees of color of all pixels in the image of human face, and determine the weighted value as the confidence degree of skin color that the skin color of the human face in the image of human face belongs to the target skin color.

8. The method of claim 1, wherein determining the target color gamut difference of the respective pixels in the image of human face comprises:
determining a target image region in the image of human face; and
determining a target color gamut difference of respective pixels in the target image region.

9. The method of claim 1, wherein the two designated color components comprise a red color component and a green color component, and the target skin color is a black skin color.

10. A skin color identification apparatus, comprising:
a processor; and
a memory storing instructions executable by the processor, wherein
when executing the above executable instructions, the processor is configured to:
acquire an image of human face;
determine a target color gamut difference of respective pixels in the image of human face, the target color gamut difference of the respective pixels being a difference between intensity values of two designated color components of the respective pixels; and
determine a confidence degree of color of the respective pixels in the image of human face according to the target color gamut difference of the respective pixels in the image of human face, and determine a confidence degree of skin color that the skin color of a human face in the image of human face belongs to a target skin color according to the confidence degree of color of all the pixels in the image of human face, the confidence degree of skin color reflecting a probability that the skin color of the human face in the image of human face is the target skin color,
wherein when the processor is configured to determine the confidence degree of color of the respective pixels in the image of human face according to the target color gamut difference of the respective pixels in the image of human face, the processor is configured to:
determine a maximum value and a minimum value among the target color gamut difference of the respective pixels, and determine a relationship between the target color gamut difference of the respective pixels and the maximum value and the minimum value; and
calculate the confidence degree of color of the respective pixels according to the relationship between the target color gamut difference of the respective pixels and the maximum value and the minimum value.

11. The skin color identification apparatus of claim 10, wherein when the process is configured to determine the target color gamut difference of the respective pixels in the image of human face, the processor is configured to:
determine a chrominance value of respective chrominance components of the respective pixels; and
determine a target color gamut difference of the respective pixels according to the chrominance value of the respective chrominance components of the respective pixels.

12. The skin color identification apparatus of claim 11, wherein the chrominance components of the respective pixels comprises a blue color chrominance component and a red color chrominance component, when the processor is configured to determine the target color gamut difference of the respective pixels according to the chrominance value of the respective chrominance components of the respective pixels, the processor is configured to:

calculate the target color gamut difference of the respective pixels through a formula for color gamut difference according to the chrominance value of the blue color chrominance component and a chrominance value of the red color chrominance component of the respective pixels, wherein the formula for color gamut difference is C=a×(U−128)+b×(V−128), in which C represents the target color gamut difference of the respective pixels, U represents the blue color chrominance component of the respective pixels, V represents the red color chrominance component of the respective pixels, and both a and b are constants.

13. The skin color identification apparatus of claim 10, wherein when the processor is configured to calculate the confidence degree of color of the respective pixels according to the relationship between the target color gamut difference of the respective pixels and the maximum value and the minimum value, the processor is configured to:

calculate a confidence degree of color of the respective pixels through a formula for confidence degree of color according to the relationship between the target color gamut difference of the respective pixels and the maximum value and the minimum value, wherein the formula for confidence degree of color is $$P = \begin{cases} 1.0, & C < C_{min} \\ \dfrac{C - C_{min}}{C_{max} - C_{min}}, & C_{min} \leq C \leq C_{max} \\ 0.0, & C > C_{max} \end{cases},$$

in which P represents the confidence degree of color of the respective pixels, C represents the target color gamut difference of the respective pixels, $C_{min}$ represents a minimum value of the target color gamut difference, and $C_{max}$ represents a maximum value of the target color gamut difference.

14. The skin color identification apparatus of claim 10, wherein when the processor is configured to determine a maximum value and a minimum value among the target color gamut difference of the respective pixels, the processor is configured to:

obtain statistics of target color gamut differences of pixels in a plurality of images of human face with a target skin color, and draw a scatter diagram according to the statistics, wherein each scatter in the scatter diagram represents one target color gamut difference;

determine distribution of the target color gamut differences of the pixels in the image of human face with the target skin color according to the scatter diagram; and take an interval of the target color gamut differences, in which the scatters are densely distributed, on the scatter diagram, as a value range of the target color gamut difference, wherein a minimum value of the value range of the target color gamut difference is the minimum value $C_{min}$ of the target color gamut difference, and a maximum value of the value range of the target color gamut difference is the maximum value $C_{max}$ of the target color gamut difference.

15. The skin color identification apparatus of claim 10, wherein when the processor is configured to determine a confidence degree of skin color that the skin color of a human face in the image of human face belongs to a target skin color according to the confidence degree of color of all the pixels in the image of human face, the processor is configured to:

average the confidence degree of color of all the pixels in the image of human face to obtain an average confidence degree of color of the confidence degree of color of all the pixels in the image of human face, and determine the average confidence degree of color as the confidence degree of skin color that the skin color of a human face in the image of human face belongs to a target skin color.

16. A skin color identification method, comprising:
acquiring an image of human face;
determining a target color gamut difference of respective pixels in the image of human face, the target color gamut difference of the respective pixels being a difference between intensity values of two designated color components of the respective pixels; and
determining a target color gamut difference of the image of human face according to the target color gamut differences of all the pixels in the image of human face, and determining a confidence degree of skin color that the skin color of a human face in the image of human face belongs to a target skin color according to the target color gamut of the image of human face; or,
determining a confidence degree of color of the respective pixels in the image of human face according to the target color gamut difference of the respective pixels in the image of human face, and determining a confidence degree of skin color that the skin color of a human face in the image of human face belongs to a target skin color according to the confidence degree of color of all the pixels in the image of human face, the confidence degree of skin color reflecting a probability that the skin color of the human face in the image of human face is the target skin color, wherein determining the target color gamut difference of the respective pixels in the image of human face comprises:

determining a chrominance value of respective chrominance components of the respective pixels, the chrominance components of the respective pixels comprising a blue color chrominance component and a red color chrominance component; and calculating the target color gamut difference of the respective pixels through a formula for color gamut difference according to the chrominance value of the blue color chrominance component and a chrominance value of the red color chrominance component of the respective pixels, wherein the formula for color gamut difference is C=a×(U−128)+b×(V−128), in which C represents the target color gamut difference of the respective pixels, U represents the blue color chrominance component of the respective pixels, V represents the red color chrominance component of the respective pixels, and both a and b are constants.

17. The method of claim 16, wherein determining a target color gamut difference of the image of human face according to the target color gamut differences of all the pixels in the image of human face comprising:

averaging the target color gamut differences of all pixels in the image of human face to obtain an average target color gamut difference of the target color gamut differences of all pixels in the image of human face, and determining the average target color gamut difference as the target color gamut difference of the image of human face.

18. The method of claim 16, wherein determining the target color gamut difference of the image of human face according to the target color gamut of all pixels in the image of human face comprising:

performing a weighting operation on the target color gamut of all pixels in the image of human face to obtain a weighted value of the target color gamut of all pixels in the image of human face, and determining the weighted value as the target color gamut difference of the image of human face.

* * * * *